Oct. 2, 1962     J. A. SUNDQUIST     3,056,944

MEANS FOR MOUNTING CORD GRIPS

Filed May 21, 1959

INVENTOR
John A. Sundquist
BY
Wooster, Davis & Cifelli
ATTORNEYS

United States Patent Office 3,056,944
Patented Oct. 2, 1962

3,056,944
MEANS FOR MOUNTING CORD GRIPS
John A. Sundquist, Fairfield, Conn., assignor to Harvey Hubbell, Incorporated, Bridgeport, Conn., a corporation of Connecticut
Filed May 21, 1959, Ser. No. 814,722
12 Claims. (Cl. 339—103)

This invention relates generally to electrical wiring devices, such as electrical plugs or caps, and particularly to those having means for gripping the electrical cord or cable that is connected to them to relieve the strain of the cord or cable on the electrical connections of the cord or cable wires in the device.

The idea of providing cord gripping means on electrical wiring devices, such as electrical plugs or devices is generally known, and these devices are commonly referred to as "cord grip wiring devices." One highly commercially successful type of cord grip wiring device generally employs a pair of cord clamps that extend through an opening in the wiring device and are mounted in the wiring device for adjustment toward and away from each other, and are arranged to tightly grip a cord that is connected to the wiring device. It has been found expedient in practice to provide different size cord clamps to accommodate different size electrical cord. It has also been found expedient in practice to have different types and sizes of devices having different size cord clamp openings. This has created a problem, for when smaller size cord clamps are used with devices having larger size openings, the cord clamps tend to fall out of the large openings under certain conditions, particularly during connection of the cord to the wiring device. This problem has resulted in the art providing different size cord clamps to be used with devices having different size openings, and this has necessitated the users of these cord grip devices making sure that the proper size cord clamp is used with the proper size wiring device opening. The objectional aspect of this arrangement should be apparent, for it has required that users maintain a supply of different size cord clamps and devices, and there is always the danger that the wrong size cord clamp will be used with the wrong wiring device.

It is an object of this invention to provide an improved cord grip wiring device wherein the same size cord clamps can be used with devices having different size openings, and vice versa.

The object of the invention is achieved in one form by providing means in cord grip wiring devices of the referred-to type which prevent the inadvertent separation of the cord clamps from the wiring device regardless of the relative size of their mounting portions, and permit different size cord clamps to be utilized with devices having different size openings.

The above and other objects and further details of that which I believe to be novel and my invention will be clear from the following description and claims taken with the accompanying drawings, wherein:

Figure 1:
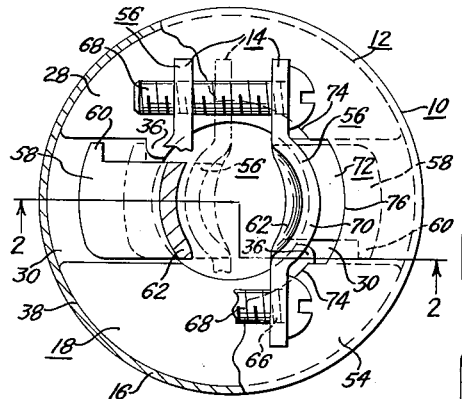
FIG. 1 is a plan view of one form of an electrical cord grip cap that incorporates the invention, with portions broken away for clarity and shown in section substantially on line 1—1 of FIG. 2.
Figure 7:
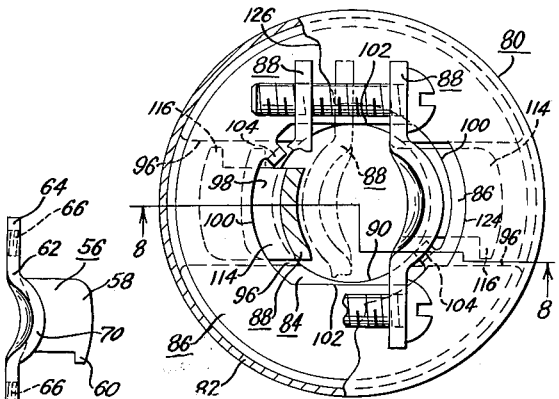
FIG. 7 is a plan view of another form of electrical cord grip cap that incorporates the invention, with portions broken away for clarity and shown in section, substantially on line 7—7 of FIG. 8.

In the drawings two forms of the invention are illustrated. In FIGS. 1–6 the invention is illustrated as being incorporated into a cord grip cap having two male electrical contact fingers that is designed for use with a two-wire electrical cord. In FIGS. 7–11 the invention is illustrated as being incorporated into a cord grip cap having three male electrical contact fingers, one being a grounding contact finger, that is designed for use with a three-wire electrical cord. Both forms of the invention are predicated on the same basic inventive concept and are intended to merely be exemplary of the various types of electric wiring devices into which the invention may be incorporated. Therefore, it should be clearly understood that the invention may be incorporated into various and other types of wiring devices.

The cord grip cap of the FIGS. 1–6 form of the invention is designated generally by reference numeral 10, and essentially comprises a cap portion 12 and a cord grip means 14. The cap portion 12 comprises a cap cover 16, which is illustrated in the form of a cup-shaped, metallic shell, and a cover lining 18 in the form of a rigid plastic body that is securely mounted in the cap cover. If desired, the cap cover could simply be a flat, disk-like member that is secured to the top of cover lining 18 in any conventional manner, as by securing screws. The cover lining 18 is a cylindrical section, has a cylindrical side wall 38, has a central coaxial opening 20 formed therein and has two generally flat, spaced, parallel sides 22 and 28. Flat side 22 has a deep recess 24 formed therein which communicates with the opening 20. Recess 24 has a non-circular periphery, as can best be seen in FIG. 3, and is adapted to house the connecting portions of a pair of male electrical contact finger and terminal units 26.

The other flat side 28 of the cover lining has a pair of aligned, shallow channels 30 formed therein which communicate with the opening 20. Each channel 30 is formed by a flat surface 32 which is offset from and parallel to the side 28, and a pair of spaced, parallel shoulders 34. One shoulder 34 of each pair, in the vicinity of where it intersects with the opening 20, extends toward its associated shoulder 34 and thereby forms a lug 36 which extends into its associated channel 30, and which is integral with the cover lining.

Figures 3, 4:
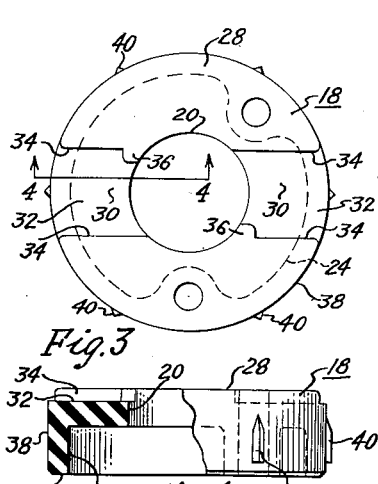
FIG. 3 is a plan view of the plastic cover lining which is a part of the FIGS. 1 and 2 cap.
FIG. 4 is a side elevational view of the plastic cover lining, with portions broken away and shown in section taken substantially on line 4—4 of FIG. 3.
Figures 9, 10:
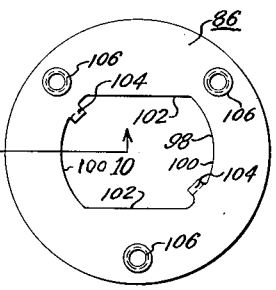
FIG. 9 is a plan view of the top plate which is a part of the FIGS. 7 and 8 cap.
FIG. 10 is a side elevational view of the top plate with portions broken away and shown in section taken substantially on line 10—10 of FIG. 9.
Figure 11:
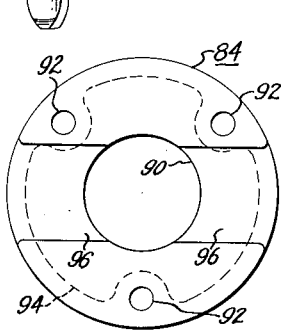
FIG. 11 is a plan view of the rubber cover lining which forms a part of the FIGS. 7 and 8 cap.

The construction of the side 28 of the cover lining 18 can be most clearly seen in FIG. 3, where it can also be observed that the cylindrical side wall 38 of the cover lining 18 has a plurality of radially outwardly extending wedge-like projections 40 formed thereon. These projections aid in securely mounting the cover lining 18 in the cap cover 16, as will become apparent subsequently.

Each male electrical contact finger and terminal unit 26 comprises an elongated contact finger 42 and a bent mounting and terminal wall 44. Each wall 44 has a terminal binding wall portion that adjustably supports a usual terminal binding screw 46 in a threaded opening formed therein (not shown). The walls 44 are rigidly connected to the cover lining 18 in any suitable known manner, as by being riveted or bolted thereto. When fully mounted, the units 26 are rigidly secured to the cover lining 18 in its recess 24 in such a manner that the contact fingers 42 are spaced from each other and extend away from the cover lining to the exterior of recess 24, and the terminal binding screws 46 and their associated terminal binding wall portions of the walls 44 are disposed adjacent to one end of the cover lining opening 20 in position to have the electrical leads 48 of the two-wire electrical cord 50 which is to be connected to the cap portion 12 attached to them in a known manner. The recess 24 in the cover lining is closed by a protective disk 51 in the form of an appropriately apertured plate of electrical insulating fiber board which is securely mounted in the cover lining in any convenient manner, as by frictional engagement. To assemble the cover lining 18 and cap cover 16, the former is forceably inserted into the latter, and the projections 40 are thereby stressed into tight frictional engagement with the inside wall surface of the cap cover and assist in maintaining the cap parts securely connected.

Covering lining 18, when fully mounted, is further securely connected within the cap cover 16, as by having the free cylindrical end 52 of the cap cover deformed radially inwardly over the peripheral portion of the cover lining side 22 to further securely connect these parts. It will be understood by those skilled in this art that the cover lining 18 may be assembled to the cap cover 16 after the former has had the units 26 connected to it, and that after assembly, the protective disk 51 may be mounted on the cover lining to close recess 24, but allow the contact finger 42 to extend through the openings (not shown) in the protective disk to the exterior of the cap portion. When the cover lining 18 is disposed within the cap cover 16, its side 28 is contiguous with the inner surface of the flat wall 54 of the cap cover, and therefore, the channels 30 in the cover lining cooperate with the wall 54 to form a pair of aligned cavities which communicate with opening 20 and which are adapted to slidably receive mounting portions of cord clamps 56 which form a part of the cord grip means 14.

Figures 2, 5, 6:
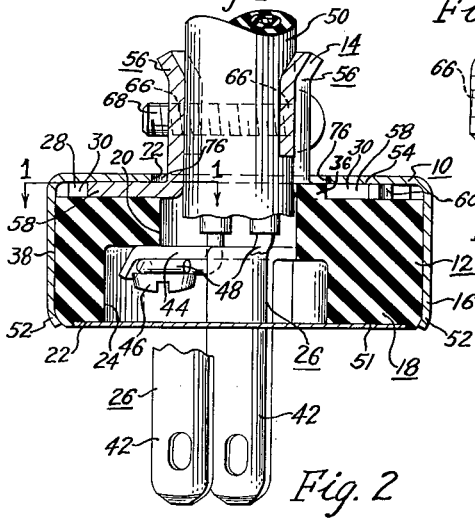
FIG. 2 is a sectional view thereof taken substantially on line 2—2 of FIG. 1, but also showing a two-wire electrical cord connected to the cap.
FIG. 5 is a plan view of a cord clamp which is a part of the FIGS. 1 and 2 cap.
FIG. 6 is a side elevational view of the cord clamp.

Each of the cord clamps 56, which can be most clearly seen in FIGS. 5 and 6, is generally identical and comprises a mounting portion in the form of a flat foot 58 having an integral laterally projecting lug 60, the purpose of which will become subsequently apparent, and a cord gripping portion in the form of an upstanding arcuately bent wall 62 having a pair of oppositely extending ears 64, each of which has an opening 66 formed therein. The cord clamps 56 are mounted in the cap portion 12 through an opening 72 formed in cap cover wall 54 and aligned with opening 20 by having their feet 58 slidably received in the cavities formed by the channels 30 and the cap flat wall 54. When so mounted, the cord clamps 56 may selectively be moved toward and away from each other, i.e., be moved radially relative to the cover lining 18 and cap cover 16. The cord clamps 56 are disposed to have their upstanding walls 62 adjacent to, parallel to, and opposing each other, and the cord clamps are connected to each other by the bolts 68, each of which is threadedly received in one of a pair of aligned openings 66 formed in a pair of adjacent clamp ears 64, and which are turned to adjust the cord clamps. As can best be seen in FIG 1, the cord clamps 56 are adjustably mounted on the cap portion 12 for selective radial movement toward and away from each other to allow mounting and gripping of the electrical cord 50. Such movement is permitted by the slidable mounting of the clamp feet 58 in their associated cavities. In FIG. 1, the left hand cord clamp 56 is illustrated in dot-dash lines in one representative position to which it may be adjusted by turning the bolts 68. The upper free end of each cord clamp wall 62 is slightly bent outwardly so as to form smooth entrance portions 70 which cooperate to allow smooth entry of one end of the cord 50 through the assembled cord clamps and openings 72 and 20 during assembly of the cord to the cord grip cap 10.

The structure described thus far, with the exception of the lugs 36 and 60, may be considered, in general, to be the prior art setting for my improvement. As was pointed out in the introduction to this specification, this known type of cord grip cap possesses the deficiency of not allowing various size cord clamps to be used with caps having various size openings. It will be observed from FIGS. 1 and 2 that when the cord clamps 56 are fully assembled, they extend through the opening 72 formed in the cap cover wall 54. The opening 72 is noncircular, being formed by a pair of angularly spaced, arcuate wall edges 74 which fall on a common circle, a second pair of angularly spaced, arcuate wall edges 76 which fall on a radially outwardly spaced circle, and two pairs of straight edges which connect the arcuate edges. When small prior art cord clamps, which do not have lugs 60, are used with caps having relatively large openings corresponding to the opening 72, they are likely under certain conditions of use, principally during initial connection of the electrical cord to the cord grip cap, to inadvertently fall out of the cap opening.

This problem is eliminated by my invention, which insures the retention of the cord clamps 56 on the cap portion 12 unless it is desired to intentionally separate them. This results from the cooperative interaction of the lugs 36, which are integrally formed with the cover lining 18, and the lugs 60, which are integrally formed on the clamp feet 58. The structural and dispositional relationship of these lugs when the clamps 56 are fully mounted in the cap portion 12 can best be seen in FIG. 1. The cord clamps may be adjusted radially inwardly and outwardly in their mounting cavities to cause movement of their cord gripping walls 62 toward and away from each other. When moved to their extreme radially inward position (for example, see the dot-dash line position of the left hand clamp 56 in FIG. 1), the cord clamp lugs 60 engage the cover lining lugs 36 and prevent further radial inward movement of the cord clamps, which movement in the absence of the limiting action of the lugs would result in separation of the cord clamps from the cap portion 12. Therefore, in normal operation, inadvertent disassembly of the cord clamps 56 from the cap portion 12 is eliminated by the cooperative action of the lugs 60 and 36. If it is desired to intentionally disassemble the cord clamps, this may be effected by pivoting the cord clamps about the point of contact of each lug 60 and lug 36.

With the foregoing construction, it will be understood that the two-wire electrical cord 50 may be electrically connected to the cord grip cap 10 by: (1) turning the cord clamp bolts 68 to separate the cord clamp gripping walls 62 to the desired extent, (2) inserting an end of the cord 50 between the walls 62, through the cap cover opening 72 and cover lining opening 20, and (3) electrically connecting the cord leads 48 to the terminal portions of the units 42. After such electrical connection, the cord clamp bolts 68 may be turned to move the walls 62 toward each other to securely grip the cord 50, and thereafter function in their usual cord gripping manner. With my improved construction, the same size cord clamps may be used with caps having different size openings corresponding to opening 72, and different size cord clamps may be used with caps having the same size openings, without having the cord clamps unintentionally disassembled during normal use, and particularly during the operation of connecting an electrical cord to the cord grip cap.

The second form of the invention is illustrated in FIGS. 7 through 11 as being incorporated in a grounding cord grip cap for a three-wire electrical cord. The cord grip cap of the second form is designated generally by reference numeral 80, and comprises a cap cover 82 in the form of a cup-shaped, metal shell, a cover lining 84 in the form of a cylindrical resilient body which is securely mounted within the cover 82, a top plate 86 in the form of a disk-like metal plate which is mounted in the cover 82 next to the cover lining 84, and cord gripping means in the form of a pair of cord clamps 88. Cord clamps 88 are constructed and operate in a generally similar manner to that of cord clamps 56 of the first form of the invention. The principal difference in the two forms of the invention illustrated, aside from the fact that the second form is a grounding cap designed for use with three-wire electrical cord, resides in the construction of the cover lining. Whereas the cover lining 18 of the first form of the invention is made of a rigid plastic and includes integral lugs 36, the cover lining 84 of the second form is made of resilient material and is closely associated with top plate 86 which includes the lugs which correspond to lugs 36, as will become apparent.

The cover lining 84 is made of a resilient material, such as a natural or synthetic rubber, is a cylindrical section, and includes a coaxial central opening 90 and a plurality of mounting openings 92. Cover lining 84 has two flat sides and has an irregularly shaped recess 94 formed in one side thereof, and a pair of aligned channels 96 formed in the other side thereof which extend radially and intersect the opening 90.

The top plate 86 comprises a thin disk-like metal plate having a central opening 98, which is noncircular and formed by a pair of spaced, arcuate edges 100 and a pair of straight, spaced, parallel edges 102. Near where one of their ends intersects a straight edge 102, each of the arcuate edges 100 has a portion of the rim of top plate 86 that surrounds the opening 98 projecting into the opening 98 and bent and extending toward one side of the top plate to form projecting lugs 104. The top plate 86 also has a plurality of internally threaded collars 106 formed thereon which extends to the other side thereof.

Figure 8:
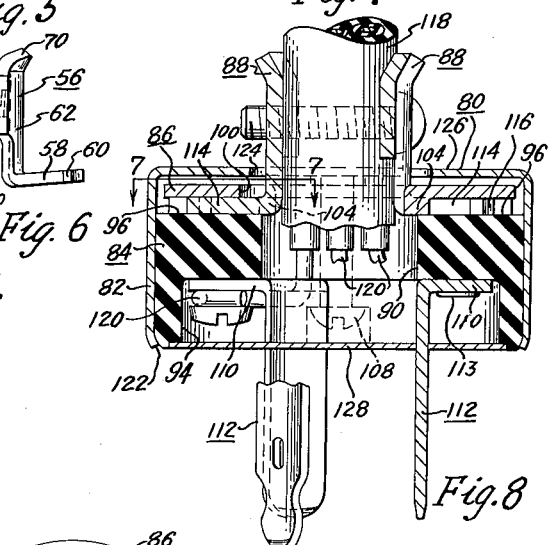
FIG. 8 is a sectional view taken substantially on line 8—8 of FIG. 7, but also showing a three-wire electrical cord connected to the cap.

The cover lining 84 and top plate 86 are secured to each other so as to be disposed as illustrated in FIG. 8 by a plurality of threaded bolts 108 which extend through the openings 92 in the cover lining 84 and are threadedly received in the collars 106 in the top plate 86. The terminal and mounting portions 110 of the male electrical contact finger and terminal units 112 are disposed in recess 94 and are connected to the cover lining 84, as by the rivets 113, which are embedded in the cover lining, pass through mounting openings in the portions 110, and are bent over in a known manner to secure the parts. When the cover lining 84 and top plate 86 are connected, the channels 96 and portions of the top plate cooperate to form cavities in which the feet 114 of the cord clamps 88 may be slidably received for radially inward and outward movement. Each of the clamp feet 114 includes a laterally projecting lug 116. The clamp lugs 116 and the lugs 104 of the top plate 86 cooperate in the same general manner as the lugs 60 and 36 of the first form of the inventoin to prevent the inadvertent separation of the cord clamps 88 and their associated caps, regardless of the relative size of their cooperating mounting portions.

It will be understood that the cord clamps 88 are adjustable in the same manner as the cord clamps 56 of the first form of the invention to mount and grip the three-wire, electrical cord 118, which has its leads 120 secured to the terminal portions of the units 112 individually, in a known manner. It will also be understood that the cap cover 82 is rigidly connected to the cover lining 84, as by having its free cylindrical edge 122 deformed into tight frictional engagement with the cover lining, and that the cap cover includes an opening 124 in its flat wall 126 which is similar in configuration and function to the opening 72 of the first form of the invention. However, if desired, the cap cover 82 may be omitted, in which case, top plate 86 will function as a cover. As in the first form of the invention, protective disk 128, which may be in the form of an appropriately apertured disk of electrical insulating fiber board, is securely mounted in the cover lining 84 so as to close the recess 94. Lastly, it will be understood that the second form of the invention operates in the same general manner to eliminate the same problem as that of the first form of the invention.

As will be evident from the foregoing description, certain aspects of my invention are not limited to the particular details of construction of the examples illustrated, and I contemplate that various and other modifications and applications will occur to those skilled in the art. For example, although I have illustrated and described two forms of my improved cord gripping means as being incorporated in electrical plugs or caps, it will, of course, be obvious to those skilled in the art that my invention is not limited to such an application, but may be employed with other electrical wiring devices, such as electrical cord connectors, which are connected to electrical conducting cord or cable in substantially the same manner. It is, therefore, my intention that the appended claims shall cover such modifications and applications as do not depart from the true spirit and scope of my invention.

What I claim as new and desire to secure by Letters Patent of the United States is:

1. An electrical wiring device comprising: wiring device means; and cord-gripping means; said wiring device means including a pair of aligned cavities accessible from the exterior thereof through a central opening at one end thereof which communicates with said cavities, said cord-gripping means comprising a pair of opposed cord clamps, said cord clamps having cord-gripping portions disposed on the exterior of said wiring device means, said cord clamps being supported on said wiring device means by having substantially flat mounting portions thereof slidably mounted in said cavities for movement toward and away from each other and normally readily removable through said central opening, said mounting portions being received in said cavities so as to be capable of planar sliding movement only, and lug means partially formed in said cavities and partially formed on said mounting portions, said lug means being configured and disposed only at one side of each of said cavities so as to engage and normally limit the movement of said mounting portions in the direction toward each other to prevent inadvertent removal of said mounting portions out of said cavities but to permit intentional removal of said mounting portions by pivoting them about said lug means when they engage while maintaining said mounting portions in their plane of sliding movement.

2. A device as defined in claim 1 wherein said wiring device means includes a cover and a body that is secured thereto, said cord clamps extend through said cover, and said cavities are partially formed by said body.

3. A device as defined in claim 2 wherein said cavities are partially formed by shallow channels in said body.

4. A device as defined in claim 3 wherein said cavities are formed by said channels and said cover.

5. A device as defined in claim 2 wherein said body is rigid and cooperates with said cover to define said cavities, and the lug means which is formed in said cavities is integral with said body.

6. A device as defined in claim 2 wherein said body is resilient and a rigid top plate is disposed adjacent to and between said cover and said body, said top plate cooperates with said body to define said cavities, and the lug means which is formed in said cavities is integral with said top plate.

7. A device as defined in claim 6 wherein said cavities are formed partially by shallow channels in said body.

8. An electrical wiring device comprising: wiring device means; a central opening in said wiring device means for the reception of an electrical cord to be connected to said wiring device means; a pair of aligned cavities formed in said wiring device means on opposite sides of and communicating with said opening; a pair of cord clamps supported by said wiring device means and extending through said opening, said cord clamps being dimensioned so as to be normally readily removable through said opening and having cord-gripping portions on the exterior of said wiring device means and mounting portions slidably and normally readily removably received in said cavities; said mounting portions comprising flat feet having a laterally extending lug formed at one side thereof; said mounting portions being received in said cavities so as to be capable only of planar sliding movement therein; and a lug formed in each cavity at one side thereof and adjacent to said opening, said lugs being configured and disposed when said cord clamps are mounted in said cavities and moved inwardly toward said opening to normally engage and limit the movement of said feet inwardly toward said opening but to permit intentional removal of said feet by pivoting them about said lugs when they engage while maintaining said mounting portions in their plane of sliding movement.

9. A device as defined in claim 8 wherein said wiring device means comprises a cover; a resilient body; and a rigid top plate that is disposed adjacent to and between said cover and said body; said top plate cooperates with said body to define said cavities, and the lugs which are formed in said cavities are integral with said top plate.

10. A device as defined in claim 9 wherein said cavities are formed partially by shallow channels in said body.

11. An electrical wiring device comprising a rigid cover; a body secured thereto; said cover and body having aligned central openings for the reception of an electrical cord that is to be connected to the wiring device; said cover and said body cooperating to form a pair of aligned cavities therebetween on opposite sides of and that communicate with said openings; a pair of cord clamps supported by the wiring device and extending through the opening in said cover; said cord clamps being dimensioned so as to be normally readily removable through the opening in said cover and having cord-gripping portions on the exterior of said cover and mounting portions slidably and readily removably received in said cavities through the opening in said cover; said mounting portions comprising flat feet having a laterally projecting lug formed at one side thereof, said mounting portions being received in said cavities so as to be capable of only planar sliding movement therein; and a lug formed in each cavity at one side thereof adjacent to said openings, said lugs being configured and disposed when said cord clamps are mounted in said cavities and moved inwardly toward said openings to normally engage and limit the movement of said feet inwardly toward said openings but to permit intentional removal of said feet by pivoting them about said lugs when they engage while maintaining them in their plane of sliding movement.

12. A device as defined in claim 11 wherein said body is rigid and said lugs formed in each cavity are integral with said body.

References Cited in the file of this patent
UNITED STATES PATENTS

| | | |
|---|---|---|
| 307,783 | Lincoln | Nov. 11, 1884 |
| 752,907 | Kelly | Feb. 23, 1904 |
| 828,519 | Seng | Aug. 14, 1906 |
| 1,679,723 | Hubbell | Aug. 7, 1928 |
| 1,776,580 | Deasy | Sept. 23, 1930 |
| 2,033,960 | Tiffany | Mar. 17, 1936 |
| 2,753,537 | Hubbell | July 3, 1956 |